(12) United States Patent
Smykalla

(10) Patent No.: US 9,085,273 B2
(45) Date of Patent: Jul. 21, 2015

(54) METHOD FOR SIGNAL PROCESSING OF SOLID-BORNE SOUND SIGNALS, IN PARTICULAR IN MOTOR VEHICLES, AND AN OCCUPANT PROTECTION SYSTEM WITH CORRESPONDING SIGNAL PROCESSING UNIT

(75) Inventor: Christian Smykalla, Olching (DE)

(73) Assignee: Continental Automotive GmbH, Hannover (DE)

( * ) Notice: Subject to any disclaimer, the term of this patent is extended or adjusted under 35 U.S.C. 154(b) by 809 days.

(21) Appl. No.: 13/384,808

(22) PCT Filed: Jul. 16, 2010

(86) PCT No.: PCT/DE2010/000821
§ 371 (c)(1),
(2), (4) Date: Jan. 19, 2012

(87) PCT Pub. No.: WO2011/018066
PCT Pub. Date: Feb. 17, 2011

(65) Prior Publication Data
US 2012/0121107 A1    May 17, 2012

(30) Foreign Application Priority Data
Aug. 14, 2009    (DE) .......................... 10 2009 037 619

(51) Int. Cl.
*H03G 5/00*    (2006.01)
*B60R 21/0134*    (2006.01)
(Continued)

(52) U.S. Cl.
CPC ......... *B60R 21/0134* (2013.01); *B60R 21/0136* (2013.01); *H04R 3/04* (2013.01)

(58) Field of Classification Search
USPC .................. 381/71.2, 98; 340/436; 701/45, 47
See application file for complete search history.

(56) References Cited

U.S. PATENT DOCUMENTS 4,593,553 A * 6/1986 Bonitz et al. ................. 73/35.04
5,036,467 A * 7/1991 Blackburn et al. .............. 701/47
(Continued)

FOREIGN PATENT DOCUMENTS

DE    100 15 273    10/2001
DE    102 17 031    10/2003
(Continued)

OTHER PUBLICATIONS

International Search Report of the International Searching Authority for International Application PCT/DE2010/000821, mailed Dec. 6, 2010, 3 pages, European Patent Office, HV Rijswijk, Netherlands.
(Continued)

*Primary Examiner* — Vivian Chin
*Assistant Examiner* — Friedrich W Fahnert
(74) *Attorney, Agent, or Firm* — W. F. Fasse

(57) ABSTRACT

For signal processing of solid-borne or structure-borne sound signals, in particular in motor vehicles, and a corresponding occupant protection system, a first-order high-pass filter is provided as a filter, wherein the −3 dB cut-off frequency thereof lies between the upper and lower operating frequency of the signal evaluation. The signal delay in the filter becomes significantly lower. Damping of the frequencies in the operating range becomes non-uniform, wherein components below the cut-off frequency are damped more heavily. Not only can triggering cases be detected earlier, but also non-triggering cases can be reliably detected.

20 Claims, 3 Drawing Sheets

(51) Int. Cl.
*H04R 3/04* (2006.01)
*B60R 21/0136* (2006.01)

(56) References Cited

U.S. PATENT DOCUMENTS

| | | | |
|---|---|---|---|
| 5,949,366 A * | 9/1999 | Herrmann | 342/72 |
| 6,018,980 A | 2/2000 | Kimura et al. | |
| 6,188,940 B1 | 2/2001 | Blackburn et al. | |
| 7,570,068 B2 * | 8/2009 | Bauer et al. | 324/713 |
| 7,774,116 B2 | 8/2010 | Brandmeier et al. | |
| 2006/0149449 A1 * | 7/2006 | Baur et al. | 701/45 |
| 2009/0319212 A1 * | 12/2009 | Cech et al. | 702/65 |
| 2010/0176866 A1 | 7/2010 | Fey et al. | |

FOREIGN PATENT DOCUMENTS

| | | |
|---|---|---|
| DE | 103 59 218 | 7/2005 |
| DE | 699 17 562 | 8/2005 |
| DE | 102005026188 | 12/2006 |
| DE | 102006040653 | 3/2008 |
| DE | 102007008379 | 8/2008 |
| JP | 11-006840 A | 1/1999 |
| WO | WO 2006/125719 | 11/2006 |
| WO | WO 2007/082865 | 7/2007 |

OTHER PUBLICATIONS

English Translation of PCT International Preliminary Report on Patentability of the International Searching Authority for International Application PCT/DE2010/000821, mailed Feb. 14, 2012, 7 pages, International Bureau of WIPO, Geneva, Switzerland.

German Search Report for German Application No. 10 2009 037 619.4, dated Apr. 15, 2010, 3 pages, with English translation, 3 pages, Muenchen, Germany.

* cited by examiner

METHOD FOR SIGNAL PROCESSING OF SOLID-BORNE SOUND SIGNALS, IN PARTICULAR IN MOTOR VEHICLES, AND AN OCCUPANT PROTECTION SYSTEM WITH CORRESPONDING SIGNAL PROCESSING UNIT

FIELD OF THE INVENTION

The invention relates to a method for signal processing of solid-borne or structure-borne sound signals, in particular in motor vehicles, and an occupant protection system with a corresponding signal processing unit.

BACKGROUND INFORMATION

When detecting accident situations of passenger cars, the solid-borne or structure-borne sound measurement represents anew technology. The airbag control device evaluates the structural and solid-borne sound vibrations arising in a crash and enables a fast, targeted triggering of the restraint devices.

For example, in DE 10015273 A1 already the evaluation of solid-borne sound is detected as high-frequency vibrations by a broadband sensor and from this a low-frequency acceleration component and a high-frequency solid-borne sound signal component is generated. Frequencies above 4 kHz shall be allowed to pass from a high-pass filter into the evaluation path for the solid-borne sound signal. The passband of a high-pass filter, however, requires a −3 dB cut-off frequency at or below 4 kHz for simple filters, as otherwise the signal would already be significantly damped. Or significantly more complex high-order high-pass filters would be required.

The previous filtering of solid-borne sound signals is usually effected via a bandpass, rectifying and low-pass and has some further disadvantages. These include the relatively long filter time in the sensor, which can be a problem precisely in side impact tests which are to be triggered quickly. Due to the low-pass in the current signal processing a signal is additionally delayed. The entire filter chain implicates that a high-frequency signal arrives delayed and only very strongly smoothed in the evaluation logic of an occupant protection system.

SUMMARY OF THE INVENTION

It is, therefore, an object of an embodiment of the present invention to further develop the occupant protection system and the method for signal processing such that a faster detection of triggering cases is possible without increasing the risk of false triggerings.

This object is achieved by the features of the independent claims. Advantageous further developments of the invention result from the dependent claims, wherein also combinations and further developments of individual features with each other are conceivable.

An underlying idea of an embodiment of the invention is that a first-order high-pass is used which has a significantly lower signal delay.

In addition, the −3 dB cut-off frequency is put within the operating frequency range, i.e. above the lower operating frequency. As a result, frequency components at this 3 dB cut-off frequency are damped already with −3 dB, lower frequencies in the operating range even more heavily, however, higher frequency components are damped less heavily and thus an unequal weighting between the frequency components within the operating range occurs. This is based on the recognition that the frequency of a signal actually enters quadratically into its energy, i.e. the energy varies quadratically with the frequency. It has proved to be particularly advantageous to put the −3 dB cut-off frequency in the upper half and even the upper third of the operating frequency range. The lower end of the operating frequency range is here determined by the ever increasing damping of the high-pass filter and the upper end of the operating frequency range is limited by the sampling rate, and/or preferably by a very high-frequency anti-alias filter.

By this technically simply feasible dimensioning of the filter and orientation of the cut-off frequency it can be ensured that triggering cases in fact lead to a significantly faster triggering decision in the signal processing unit, however, non-triggering cases can be distinguished sufficiently.

The limitation of the operating range downward thus is effected essentially by the high-pass, the limitation of the operating range upward, i.e. the upper frequency of the operating range can be effected particularly by the sampling frequency of the analog-to-digital conversion, wherein this A/D conversion can be effected before or after the filtering, i.e. the filtering can be analog or digital.

BRIEF DESCRIPTION OF THE DRAWINGS

The invention is now described in the following in detail on the basis of an example of embodiment with the aid of the accompanying drawings. In the following, functionally identical and/or identical elements can be provided with identical reference numerals, in which.

DETAILED DESCRIPTION OF EXAMPLE EMBODIMENTS OF THE INVENTION

Figure 1B:
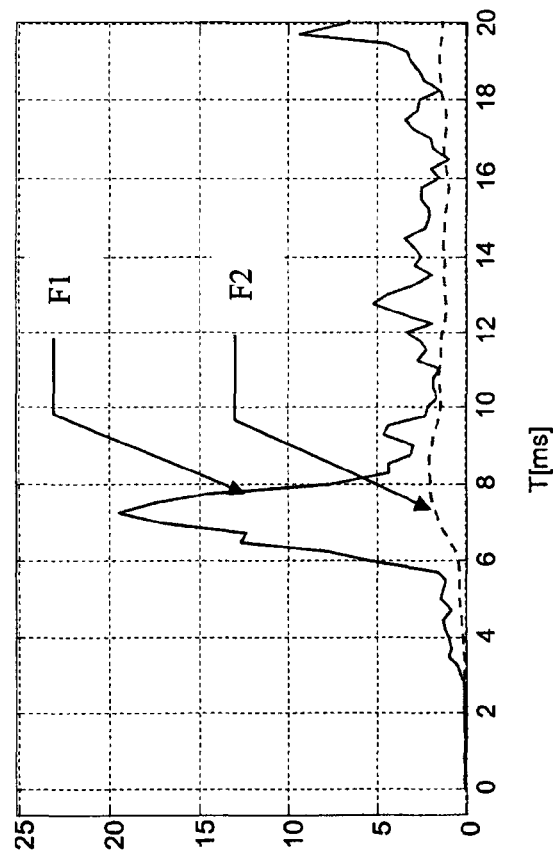
FIG. 1b shows in comparison a signal F2 filtered according to the conventional method and a signal F1 filtered according to an embodiment of the method according to the invention.
Figure 1A:
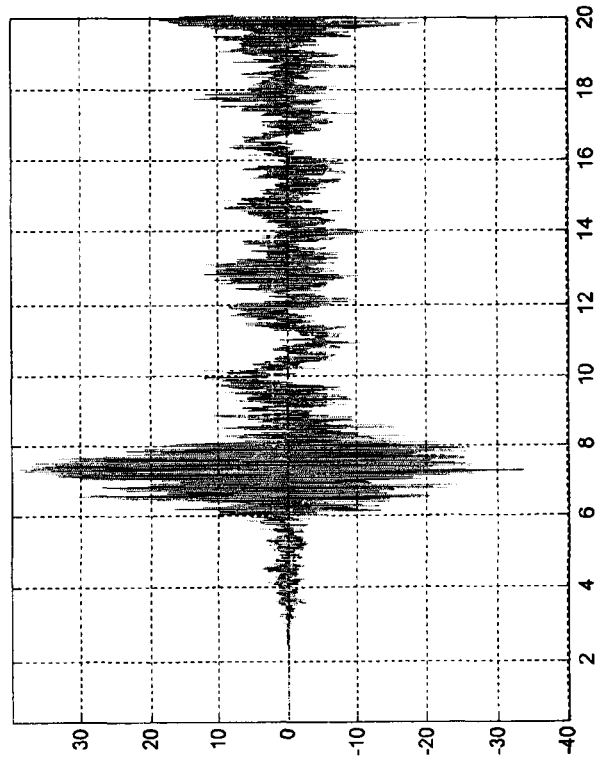
FIG. 1a shows a solid-borne sound raw signal.

FIG. 1a shows the solid-borne sound raw signal unfiltered. FIG. 1b outlines in comparison the energy signal obtained therefrom by filtering once with the conventional method (dashed line F2) and also with the high-pass filter (solid line F1) proposed according to an embodiment of the invention. It is clearly visible in this comparison, that the energy signal significantly better represents the envelope of the solid-borne sound raw signal than the conventional methods can do this.

Figure 3:
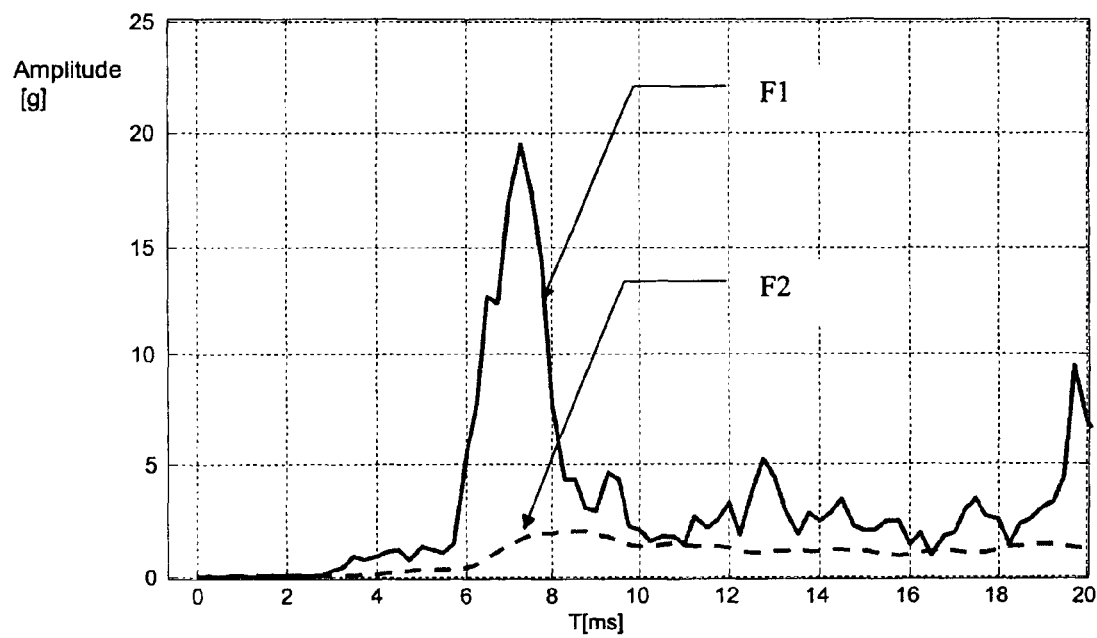
FIG. 3 shows inventive (F1) and conventional (F2) filtered signals for a triggering case in comparison to each other.

FIG. 3 shows FIG. 1b in a better resolution. The filtering with a high-pass according to an embodiment of the invention (solid line F1) clearly visibly offers already a very strong first local maximum, upon integration of which a triggering level or threshold is exceeded fairly early, whereas in contrast with the conventional signal F2 the maximum appears significantly weaker and moreover delayed.

Figure 2:
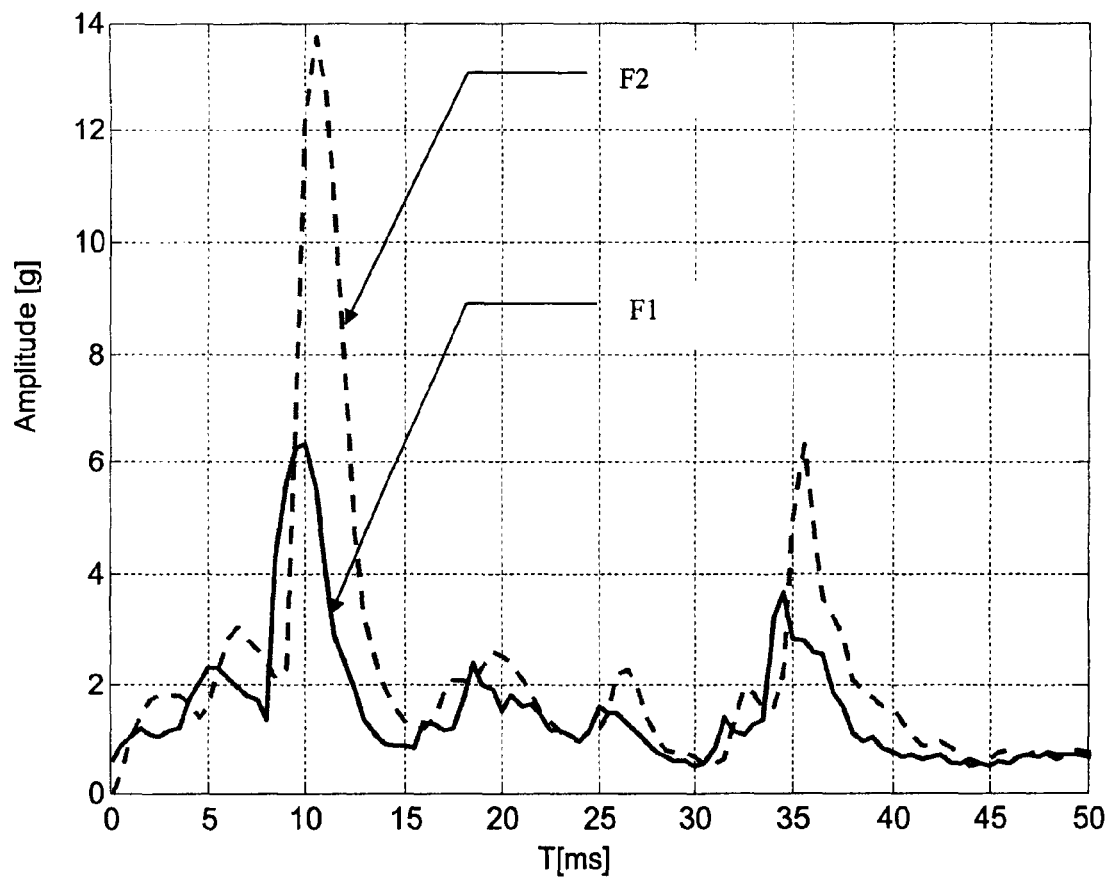
FIG. 2 shows inventive (F1) and conventional (F2) filtered signals for a non-triggering case in comparison to each other.

While the higher sensitivity with triggering cases may not yet be particularly surprising, however, the special effect of the filter method according to the invention becomes apparent in FIG. 2 using the example of a non-triggering case, for example a lateral bump into curbs. In fact, with non-triggering cases the energy of the solid-borne sound signal in the initial phase is all in all also comparably high, but the frequency distribution differs. Accordingly, with non-triggering cases low-frequency components are responsible for the high solid-borne sound energy visible at first.

However, by dimensioning the high-pass filter such that it is purposely not constant within the operating frequency range to be evaluated, but noticeably dampens low-frequency components there, this leads to an improvement also with the non-triggering cases. Accordingly, the evaluated energy with the high-pass (solid line F1) in fact increases earlier, however, it is significantly lower than with the conventional filter (dashed line F2).

This is due to the fact that the filter in an inventive embodiment is a first-order high-pass filter and its −3 dB cut-off frequency lies above the lower operating frequency, preferably between the lower and upper operating frequency.

With this, the operating frequencies frequently occurring with non-triggering cases are damped below the −3 dB cut-off frequency with 3 dB and more, while the powerful higher frequencies occurring with triggering cases are hardly damped.

In one example embodiment the lower and upper operating frequency lies between 2.5 kHz and 15 kHz, preferably between 5 kHz and 10 kHz, and the −3 dB cut-off frequency between 5 kHz and 10 kHz, preferably at approximately 7 kHz. However, these values vary by vehicle type, as the differences in vehicle mass, suspension and damping as well as body stiffness also lead to a deviating vibration behavior and a deviating solid-borne sound signal characteristics.

Figure 4:
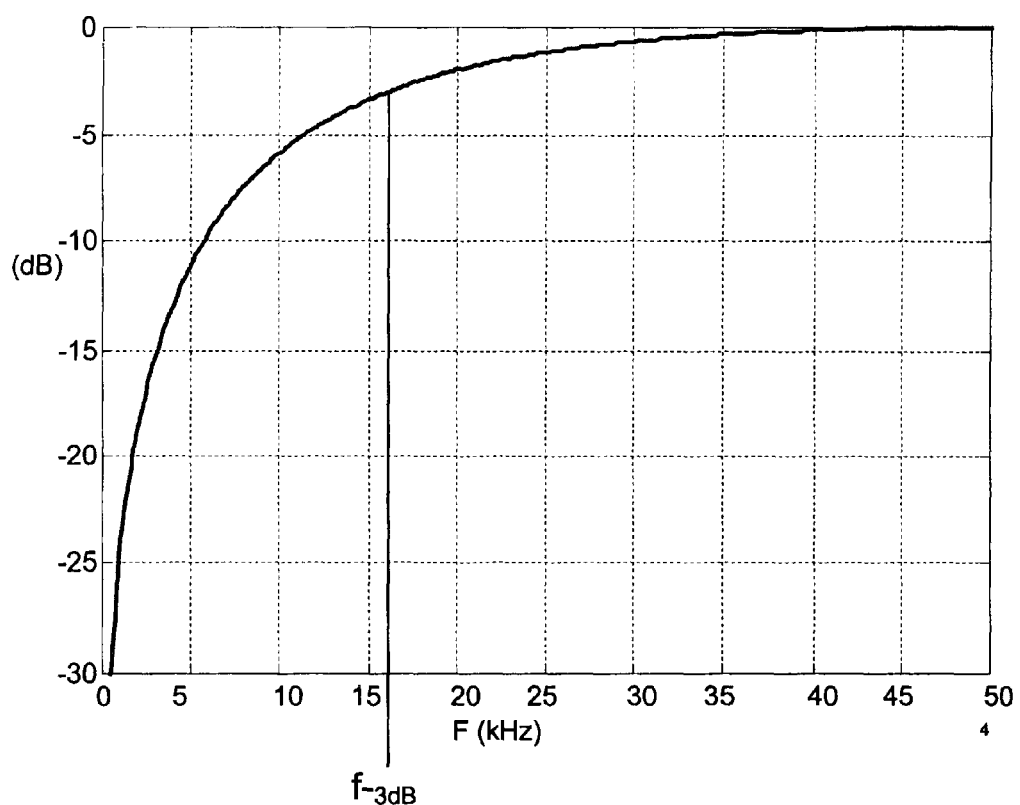
FIG. 4 shows a frequency response of the filter according to an embodiment of the invention.

In another example embodiment the lower and upper operating frequency lies between 2.5 kHz and 25 kHz, preferably between 5 and 18 kHz and the 3 dB cut-off frequency between 8 kHz and 18 kHz, preferably at approximately 16 kHz. In this example embodiment the damping of the low-frequency components of the solid-borne sound in the operating range has a stronger effect, for example at 5 kHz already −12 dB as is outlined again in FIG. 4 on the basis of such a frequency response.

To keep influences from the low-frequency signal range especially small and thus to avoid resonant frequencies of the vehicle structure and of the housing, in which the sensor is supposed to be located, in the signal evaluation, the energy of the signal reaching the evaluation, i.e. after frequencies is evaluated by an unequal, thus non-constant weighting.

Signals with higher frequency contents with identical amplitude in the time domain have more energy. Therefore, a signal, which contains higher frequency components will have quantitatively more influence via the filter characteristics than a signal with lower frequency. As of a certain frequency range, the influence of high-frequency signal components due to the damping of the signal during transmission into the housing of the sensor is negligible, often eliminating in practice the need for an upper limiting frequency. Alternatively, if necessary, also a low-pass with a cut-off frequency above the operating range can be used, preferably can be connected only adaptively with particularly high-frequency signals.

After filtering a volatile or stepped averaging can follow. The latter combines the absolute value formation, the filtering of the signal and decimation of the signal to 4 kHz.

Here, it should preferably be ensured that the data rate of the original signal is reduced by summing a certain number of values to a frequency intended for the signal processing of the acceleration signals, for example 4 values per millisecond (4 kHz). The architecture of the filter chain can be both analog and digital.

By the method according to the invention and by a corresponding occupant protection system an improved evaluation of the frequency contents of the signal is achieved. By using a very flat edge or flank of first order, low-frequency signals are evaluated with less influence or weight than high-frequency signals. Thus, an energetically more correct evaluation of the frequency contents of the signals takes place. The filtering is very simple and therefore favorably feasible and uses little space on the ASIC of the sensor. In addition, the filter times are reduced by first-order filters in connection with volatile averaging compared to a low-pass filter. Especially in the field of side crashes the better reproduction of the original signal results in advantages with regard to the early detection of crashes and the distinction of non-triggering cases.

By the frequency evaluation of the signal over the total band moreover signal components in crashes can be evaluated, which so far previously have fallen victim to (i.e. been filtered out by) the very strong filter. This is expressed both in frontal crash data as well as in side crash data. For example, side crash data is shown in FIG. 1b in the filtered state (new filter F1 and previous filter F2) and in FIG. 1a in its raw state, wherein it is remarkable how strongly the signals were smoothed with the previous filtering and how in comparison the new filtering can much better evaluate short high-frequency signal rises in the signal.

Furthermore, it is also possible via the improved energy evaluation in the signal, compared to crash tests to better detect non-triggering cases, which often have a higher energy in the low frequency range.

The invention claimed is:

1. A method for signal processing of solid-borne sound signals, in motor vehicles, comprising measuring a solid-borne sound, using a filter to provide a frequency component of the solid-borne sound, and evaluating this frequency component between a lower operating frequency and an upper operating frequency, characterized in that the filter is a first-order high-pass filter having a −3 dB cut-off frequency that lies between the upper operating frequency and the lower operating frequency, and comprising performing an unequal weighting of different frequencies within an operating range between the lower operating frequency and the upper operating frequency, wherein frequencies in the operating range below the −3 dB cut-off frequency are damped more than −3 dB and frequencies in the operating range above the −3 dB cut-off frequency are damped less than −3 dB.

2. The method according to claim 1, characterized in that the 3-dB cut-off frequency lies in an upper half of the operating range between the lower operating frequency and the upper operating frequency.

3. The method according to claim 1, characterized in that the lower operating frequency and the upper operating frequency lie between 2.5 and 25 KHz.

4. The method according to claim 1, characterized in that the lower operating frequency and the upper operating frequency lie between 5 and 18 KHz.

5. The method according to claim 1, characterized in that the −3 dB cut-off frequency lies between 8 and 18 kHz.

6. The method according to claim 1, characterized in that the −3 dB cut-off frequency is approximately 16 kHz.

7. A vehicle occupant protection system comprising a sensor that is sensitive to solid-borne sounds and is configured and adapted to produce a corresponding solid-borne sound signal, a filter configured, arranged and adapted to provide a frequency component of the signal, and a signal evaluation unit configured, arranged and adapted to evaluate the frequency component between a lower operating frequency and an upper operating frequency, wherein the filter is a first-order high-pass filter having a −3 dB cut-off frequency between the upper operating frequency and the lower operating frequency, and wherein the filter and the signal evaluation unit are configured in relation to one another to perform an unequal weighting of different frequencies within an operating range between the lower operating frequency and the upper operating frequency, wherein frequencies in the operating range below the −3 dB cut-off frequency are damped more than −3 dB and frequencies in the operating range above the −3 dB cut-off frequency are damped less than −3 dB.

8. The vehicle occupant protection system according to claim 7, wherein the −3 dB cut-off frequency lies in an upper half of the operating range.

9. The vehicle occupant protection system according to claim 7, wherein the −3 dB cut-off frequency lies in an upper one-third of the operating range.

10. The method according to claim 1, further comprising triggering an occupant protection device of the motor vehicle dependent on a result of the evaluating.

11. A method comprising the following steps:
a) with a sensor in a motor vehicle, sensing a structure-borne noise in said motor vehicle and producing a noise signal;
b) with a first-order high-pass filter having a specified −3 dB cut-off frequency, filtering said noise signal or a further processed version thereof to produce a filtered signal;
c) with a signal processing unit, evaluating said filtered signal or a further processed version thereof in a frequency range from a lower operating frequency to an upper operating frequency, wherein said signal processing unit and said filter are configured in relation to one another so that said specified −3 dB cut-off frequency of said filter lies above said lower operating frequency and so as to perform an unequal weighting of different frequencies within said frequency range, wherein frequencies in said frequency range below said specified −3 dB cut-off frequency are damped more than −3 dB and frequencies in said frequency range above said specified −3 dB cut-off frequency are damped less than −3 dB; and
d) dependent on a result of said evaluating, triggering an occupant protection device of said motor vehicle.

12. The method according to claim 11, further comprising, between said steps a) and b), a step of sampling and digitizing said noise signal to produce a digital noise signal as said further processed version of said noise signal which is then filtered in said step b).

13. The method according to claim 11, further comprising, between said steps b) and c), a step of sampling and digitizing said filtered signal to produce a digital filtered signal as said further processed version of said filtered signal which is then evaluated in said step c).

14. The method according to claim 11, wherein said lower operating frequency is 2.5 kHz, and said specified −3 dB cut-off frequency is in a range from 5 kHz to 10 kHz.

15. The method according to claim 14, wherein said specified −3 dB cut-off frequency is approximately 7 kHz.

16. The method according to claim 11, wherein said lower operating frequency is 5 kHz, and said specified −3 dB cut-off frequency is in a range from 8 kHz to 18 kHz.

17. The method according to claim 16, wherein said specified −3 dB cut-off frequency is approximately 16 kHz.

18. The method according to claim 11, wherein said specified −3 dB cut-off frequency is at least two times said lower operating frequency or is at least 2.5 kHz above said lower operating frequency.

19. The method according to claim 11, wherein said specified −3 dB cut-off frequency is in an upper half of said frequency range.

20. The method according to claim 11, wherein said specified −3 dB cut-off frequency is in an upper one-third of said frequency range.

* * * * *